United States Patent [19]

Sakakima et al.

[11] Patent Number: 4,897,318

[45] Date of Patent: Jan. 30, 1990

[54] LAMINATED MAGNETIC MATERIALS

[75] Inventors: Hiroshi Sakakima, Hirakata; Koichi Osano, Neyagawa; Yuuji Omata, Ibaraki; Koichi Kugimiya, Toyonaka; Satoru Mitani, Hirakata, all of Japan

[73] Assignee: Matsushita Electric Industrial Co., Ltd., Osaka, Japan

[21] Appl. No.: 298,788

[22] Filed: Jan. 18, 1989

Related U.S. Application Data

[63] Continuation of Ser. No. 4,582, Jan. 20, 1987, abandoned.

[30] Foreign Application Priority Data

| Jan. 21, 1986 | [JP] | Japan | 61-10820 |
| May 22, 1986 | [JP] | Japan | 61-117875 |
| Oct. 31, 1986 | [JP] | Japan | 61-261264 |
| Oct. 31, 1986 | [JP] | Japan | 61-261265 |

[51] Int. Cl.$^4$ .................... G11B 5/127; G11B 5/62
[52] U.S. Cl. .................... 428/635; 428/668; 428/679; 428/681; 428/925; 428/928
[58] Field of Search ............... 428/928, 611, 681, 682, 428/683, 684, 685, 668, 925, 926, 679, 635

[56] References Cited

U.S. PATENT DOCUMENTS

| 3,479,156 | 11/1969 | Ginder | 428/928 |
| 3,520,664 | 7/1970 | York | 428/928 |
| 3,533,860 | 10/1970 | Kench et al. | 428/928 |
| 3,560,172 | 2/1971 | Kench et al. | 428/928 |
| 4,364,020 | 12/1982 | Lin et al. | 336/218 |
| 4,413,406 | 11/1983 | Bennett et al. | 29/609 |
| 4,437,912 | 3/1984 | Sakakima et al. | 148/403 |
| 4,506,248 | 3/1985 | Lin | 336/234 |
| 4,610,935 | 9/1986 | Kumasaka et al. | 428/678 |
| 4,687,712 | 8/1987 | Sugita et al. | 428/635 |
| 4,748,089 | 5/1988 | Kumasaka et al. | 428/928 |

FOREIGN PATENT DOCUMENTS

| 147126 | 7/1985 | European Pat. Off. | 428/928 |
| 41349 | 4/1981 | Japan | 428/682 |
| 154602 | 8/1985 | Japan | 428/682 |

Primary Examiner—John J. Zimmerman
Attorney, Agent, or Firm—Spencer & Frank

[57] ABSTRACT

Soft magnetic laminated materials having both superior wear resistance and a high saturation magnetization comprising Fe-Si alloy films 1 having small magnetostriction, and films 2 of an amorphous alloy or Fe-Si-Al alloy having both small magnetostriction and excellent wear resistance, said first and second films being alternately laminated, the thickness ($t_1$) of the first film and the thickness ($t_2$) of the second film being made to meet the following conditions:

$$t_1, t_2 < 500 \text{Å}; \text{ and } t_1 < 2t_2.$$

18 Claims, 12 Drawing Sheets

LAMINATED MAGNETIC MATERIALS

This application is a continuation of application Ser. No. 004,582, filed 1/20/87, now abandoned.

BACKGROUND OF THE INVENTION

1. Field of the Invention

The present invention relates to laminated magnetic materials which are suitable for magnetic heads.

2. Prior Art

Figure 2:
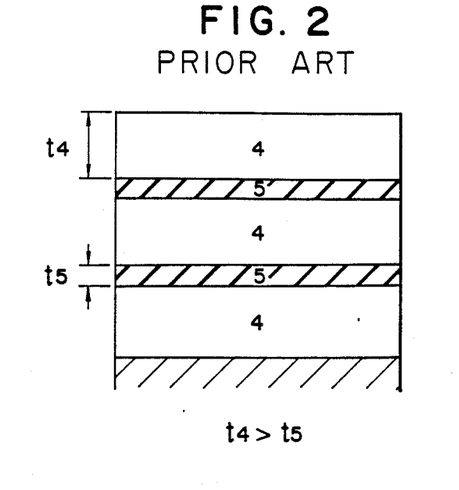
FIGS. 2 and 3 are sectional views of conventional laminated magnetic materials.
Figures 2A, 12:
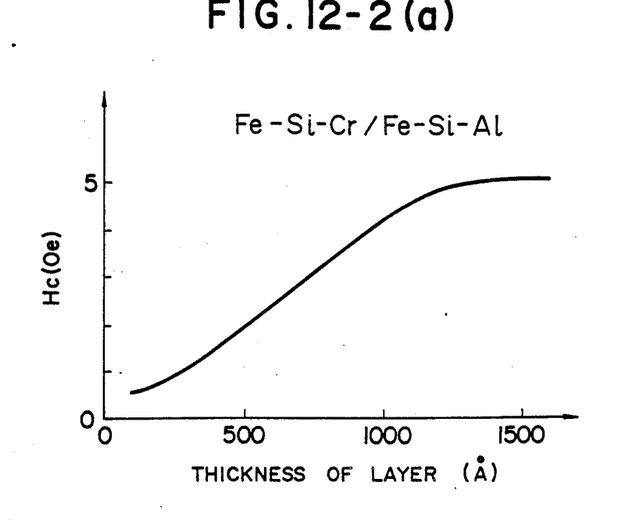
Figures 2B, 12:
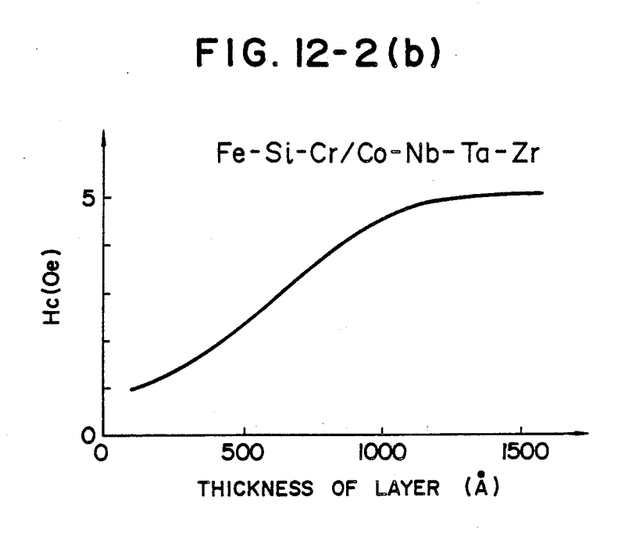
Figure 3:
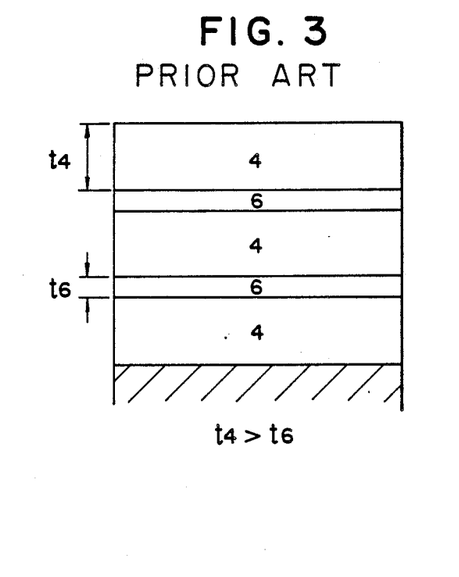

Various laminated magnetic materials have been previously invented in which insulators are interposed between magnetic substances with a view to improving their frequency characteristics, and attempts have been recently made to improve soft magnetism by forming magnetic substances themselves in a multi-layer film. For example, the former includes materials as shown in FIG. 2 in which 6.5 wt % Fe-Si films 4 having a small magnetostrictive constant are laminated and $SiO_2$ insulating layers 5 of a nonmagnetic material which are thinner than the above-described Fe-Si films 4 are interposed therebetween. Examples of the latter include materials as shown in FIG. 3 in which extremely thin Ni-Fe films 6 having a thickness of about 30 to 100 Å are interposed between Fe-Si films 4 for the purpose of improving their magnetic characteristics.

PROBLEMS TO BE SOLVED BY THE INVENTION

In the above-described conventional laminated films, although an increase in the thickness of the nonmagnetic $SiO_2$ layers improves the overall wear resistance, partial wear or abrasion occurs in portions occupied by the magnetic Fe-Si substance, the soft magnetic characteristics of the Fe-Si being deteriorated, and the relative ratio of the space occupied by the Fe-Si films in the entire laminated film is decreased, with the result that the saturation magnetization of the laminated film as a whole is undesirably reduced. On the other hand, when Ni-Fe films which are soft magnetic materials are interposed between the Fe-Si films, the soft magnetism of the Fe-Si films is not easily deteriorated even if the Ni-Fe films have a relatively large thickness; however, these multi-layer films have caused problems regarding wear resisting property when applied to magnetic heads, because the wear resistance of each of the Ni-Fe films and the Fe-Si films is low.

It is an object of the present invention to solve the above-described problems and to realize magnetic materials which have both superior wear resistance and suitable magnetic characteristics.

SUMMARY OF THE INVENTION

Means for Solving the Problems

Figure 1A:
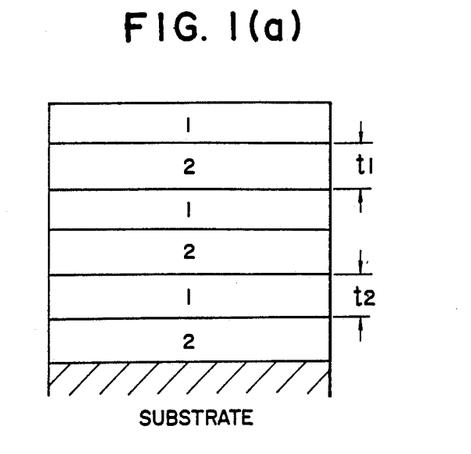
FIGS. 1a and 1b are sectional views of laminated magnetic materials adopted in embodiments of the present invention.
Figures 1A, 12:
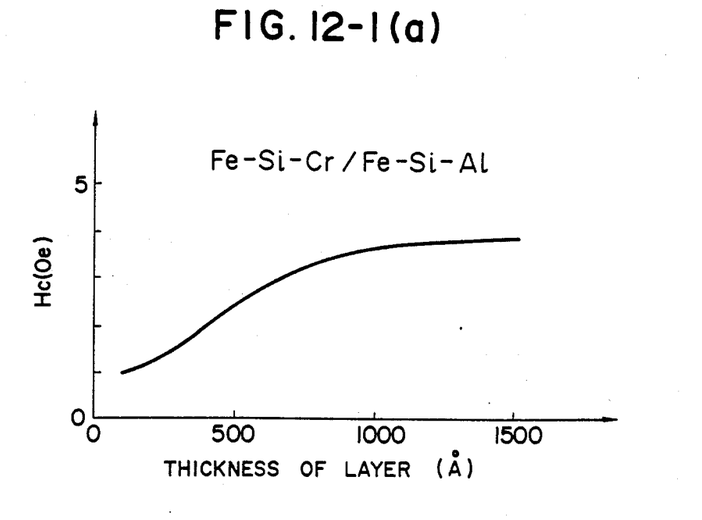
Figure 1B:
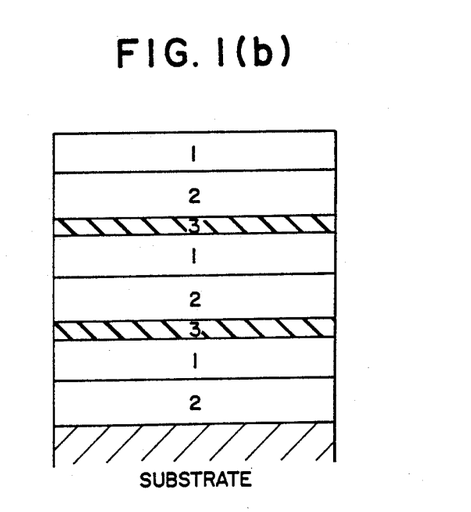
Figures 1B, 12:
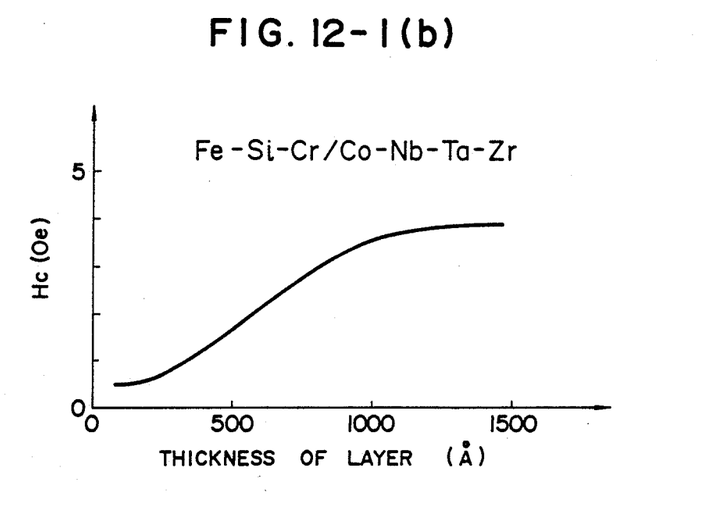

Referring to FIGS. 1(a) and 1(b) a multi-layer film is formed by alternately laminating a thin film 1 which has a magnetostrictive constant $\lambda$ less than $1\times10^{-5}$ and is essentially composed of Fe and Si and another thin film 2 which has a magnetostrictive constant $\lambda$ less than $1\times10^{-5}$ and excellent wear resistance and is composed of an amorphous alloy or a Fe-Si-Al alloy for magnetic head material having a high saturation magnetization on the whole in such a way that, if the thicknesses of each of the above-described thin films 1 and 2 are respectively $t_1$ and $t_2$, $t_1, t_2 < 500$ Å; and $t_1 < 2t_2$ Function The inventors of the present invention have found that, when two kinds of films are laminated on each other, the partial abrasion or wear between the different films is decreased by making the thickness of each of the films very thin, and the overall wear is also improved by using as one of the films, an amorphous alloy or a Fe-Si-Al alloy above-mentioned, both of, which have excellent wear resistance. A multilayered film comprising Fe-Si alloy films 1 having a magnetostrictive constant $\lambda$ less than $1\times10^{-5}$ and amorphous alloy films or Fe-Si-Al A1 alloy films 2 having a magnetostrictive constant $\lambda$ less than $1\times10^{-5}$ and excellent wear resistance is suitable for magnetic head material having a high saturation magnetization on the whole. It is possible to obtain good wear resistance by controlling the thickness of each of the films as described above.

BRIEF DESCRIPTION OF THE DRAWINGS

FIGS. 12-1a, 12-1b, 12-2a and 12-2b are graphs showing the dependence of the respective coercive force (Hc) of a Fe-Si-Cr/Fe-Si-Al multi-layer film and a Fe-Si-Cr/Co-Nb-Ta-Zr multi-layer film upon the thickness of each of the layers.

DETAILED DESCRIPTION OF THE INVENTION

Embodiments

The present invention enables provision of laminated magnetic materials which have both high saturation magnetization and excellent wear resistance. The laminated magnetic materials of the present invention are schematically shown in FIGS. 1a and 1b. In FIGS. 1a and 1b, reference number 1 denotes a soft magnetic Fe-Si film which has a magnetostrictive constant $\lambda$ less than $1\times10^{-5}$ and a saturation magnetization $4\pi M_s$ of about 16000 to 18000 Gauss, and which is essentially composed of Fe and Si. Reference number 2 denotes an amorphous magnetic alloy film or a Fe-Si-Al (Sendust) film which is known to have a magnetostrictive constant λ less than $1 \times 10^{-5}$ and excellent wear resistance. Reference number 3 in FIG. 1b denotes a layer insulating film such as $SiO_2$ or $Si_3N_4$. In the laminated magnetic material, in order to minimize the partial abrasion or wear, it is essential to have such conditions as $t_1, t_2 < 1000$ Å, and $t_1 < 2t_2$.

In regard to FIG. 1b, the layer insulating films 3 may be interposed considering the frequency region in which this laminated magnetic material is used. FIG. 1b shows only one example and the layer insulating films 3 are not necessarily interposed in the manner shown therein. They may be interposed at larger intervals depending upon the frequency, and may not be required when the total thickness of the material is smaller than the skin depth defined at the frequency at which the material is used.

Figure 4A:
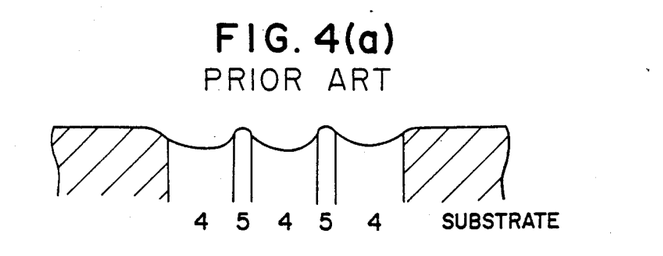
FIGS. 4a to 4c, 5, and 6 are sectional views showing the partial abrasion or wear of samples after wear resistance tests.
Figure 4B:
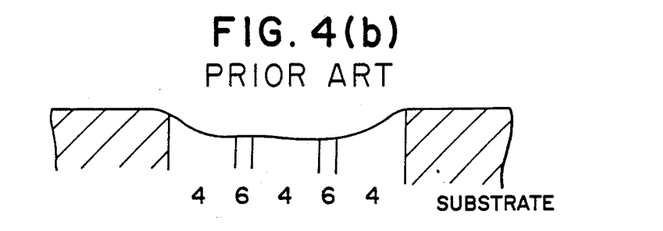
Figure 4C:
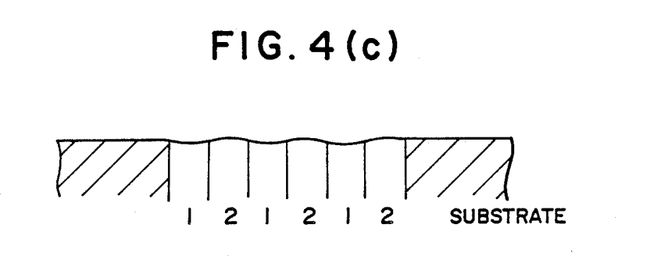
Figure 5:
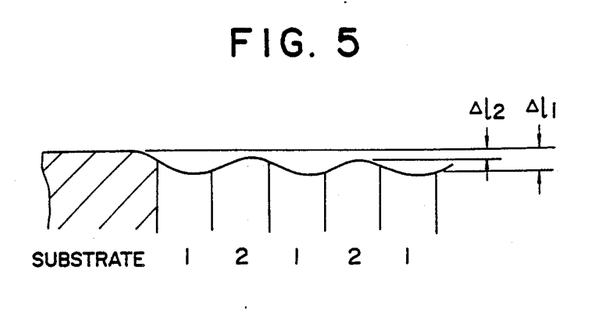

For effecting tests, the laminated magnetic materials shown in FIGS. 1a and 1b and conventional laminated magnetic materials shown in FIGS. 2 and 3 were sandwiched between wear resistant ceramic substrates so as to provide a head chip form. Then, they were mounted in a VTR deck, and their wear resistance was examined by running a tape. The results of these tests are schematically shown in FIGS. 4a and 4b. FIGS. 4a and 4b show the conventional laminate magnetic materials shown in FIGS. 2 and 3 which were sandwiched between the substrates and FIG. 4c shows the laminated magnetic materials shown in FIG. 1a which were sandwiched between the substrates. Typical embodiments will be described in detail hereinafter but the general tendency is as shown in FIGS. 4a to 4c. In FIG. 4a insulating films such as $SiO_2$ indicated by reference number 5 generally exhibit good wear resistance and, thus, partial abrasion or wear is caused in the Fe-Si films indicated by reference number 4, resulting in poor tape touch characteristics. In order to prevent the partial abrasion, if the thickness of the $SiO_2$ film indicated by reference number 5 is reduced, the overall wear is increased. On the other hand, if the thickness of this film 5 is increased, the ratio of the Fe-Si magnetic film portions is undesirably reduced with the results that the overall saturation magnetization is lowered and the soft magnetism of the Fe-Si alloy films themselves deterioration. In FIG. 4b as regards the magnetic characteristics, when the Ni-Fe films indicated by reference number 6 are made relatively thinner in thickness than the Fe-Si films indicated by reference number 4, the overall saturation magnetization is made high and the soft magnetism of the Fe-Si films is improved. However, there is a problem therein in that both films show a low wear resistance which causes a large amount of wear relative to the substrates, as shown in FIG. 4b. In the laminated magnetic material of the present invention shown in FIG. 4c it was found that if the thicknesses of the Fe-Si films 1 and the amorphous alloy or Fe-Si-Al (Sendust) alloy films 2 respectively denoted by $t_1$ and $t_2$ meet the conditions that $t_1$ is smaller than 1000 Å and that $t_1$ is smaller than $2 \cdot t_2$, both the partial abrasion and the overall abrasion can be restrained at a low level as shown in FIG. 4c. This is thought to be brought about by the above-described conditions of $t_1 < 1000$ Å and $t_1 < 2t_2$ which conditions make it possible that the Fe-Si film 1 is protected by the wear resistant magnetic film 2. Actually, it was found that if $t_1 > 1000$ Å or $t_1 < 2t_2$ in spite of $t_1 < 1000$ Å, the Fe-Si films 1 showed a partial abrasion, leading to the same result as that in FIG. 4a. It was also found that if the thickness $t_2$ of the films 2 is made larger than 1000 Å, the soft magnetism of the laminated films was deteriorated, so that it is in fact desirable that $t_1, t_2 < 1000$ Å, and $t_1 < 2t_2$     (1).

On the other hand, it was found that if $t_2$ was made smaller than 500 Å, the soft magnetism of the Fe-Si films 1 was further improved, but when the Fe-Si-Al alloy is used in the films 2, the soft magnetism of these films 2 deteriorated slightly. However, it was found that when the amorphous alloy was used in the films 2, the soft magnetism of the films was not deteriorated even if $t_2 < 500$ Å, and when $t_1, t_2 < 500$ Å, and $t_1 < 2t_2$     (2), the overall magnetic characteristics were improved and the partial abrasion of the films 1 was able to be restrained at a lower level than the case of the conditions (1).

Although a heat treatment is effective for improvement of magnetic characteristics, if $t_1$ and $t_2$ are made extremely small, interdiffusion between the films 1 and the films 2 occurs during the heat treatment. It was found that, in this case, this interdiffusion can be restrained by interposing films such as Ag, Cu, or Mg which do not readily form a solid solution with the films 1 or 2.

It is necessary for obtaining high magnetic permeability to restrain the magnetostrictive constant at a level less than $1 \times 10^{-5}$, and this requirement is satisfied in the vicinity of 6.5 weight % of Si (remainder: Fe) in the Fe-Si alloy films. The precise composition in which λ becomes 0 will be described in detail below. This Fe-Si alloy film has a slight disadvantage with respect to its corrosion resistance but this disadvantage can be improved by adding Cr, Ni, Nb, Ti, or Ru or by nitriding the film. However, in this case, it is necessary to change the Si amount in accordance with the addition amount or the nitriding amount so that λ is made small.

In the Fe-Si-Al alloy, the so-called Sendust composition region satisfies the condition $\lambda < 1 \times 10^{-5}$ and, in the case of amorphous alloys, Co-based alloys such as Co-Mn-(Fe)-(Si)-B or Co-Nb-Zr alloy are found to have λ of a sufficiently small value. It is also known that the latter, which is mainly composed of Co-Nb, is excellent with respect to both wear resistance and corrosion resistance, as described in U.S. Pat. No. 4,437,912.

It was found that, since the saturation magnetization $4\pi M_s$ of the Fe-Si alloy with $\lambda < 1 \times 10^{-5}$ is 16000 to 18000 Gauss and the $4\pi M_s$ of both the Fe-Si-Al (Sendust) alloy and the amorphous alloy is 9000 to 10000 Gauss, the average $<4\pi M_s>$ of the laminated material becomes 13000 to 14000 Gauss. By making the thickness of each of the films very small as in the case of the invention, the average characteristics of both the alloys can be obtained, and the laminated alloy films are found to have both high permeability and high saturation magnetization.

As described above, the laminated magnetic materials of the present invention are soft magnetic materials having both superior wear resistance and high saturation magnetization and are extremely useful in practice. The advantageous effect of the present invention will be described below with reference to the following embodiments.

<Embodiment 1>

6.5 wt % Si-Fe alloy films 1 and $Co_{87}Nb_9Zr_4$ (at %) amorphous alloy films 2 were alternately laminated on a ceramic substrate showing a thermal expansion coefficient $\alpha$ of $1.2 \times 10^{-5}/°C$. by sputtering. Various multi-layered films were prepared by changing the thickness $t_1$ and $t_2$ of each of the films 1 and 2, the characteristics being shown in Table 1.

TABLE 1

| Sample No. | FA1010 | FA105 | FA55 | FA53 | FA33 | FA11 |
|---|---|---|---|---|---|---|
| $t_1$ (Å) | 1000 | 1000 | 500 | 500 | 300 | 100 |
| $t_2$ (Å) | 1000 | 500 | 500 | 300 | 300 | 100 |
| n (number of layers) | 30 | 40 | 60 | 75 | 1000 | 300 |
| $4\pi M_s$ (Gauss) | 14000 | 15300 | 14000 | 15000 | 13800 | 13500 |
| $H_c$ (Oe) | 4 | 3 | 2 | 1.5 | 1 | 1 |
| Partial abrasion (μm) $\Delta l_1$ | ~0.05 | ~0.05 | ~0.01 | ~0.015 | ~0.01 | ~0.01 |
| $\Delta l_2$ | ~0 | ~0 | ~0 | ~0 | ~0 | ~0 |

$4\pi M_s$ was measured by using a vibrating sample magnetometer (VSM) and $H_c$ was measured with a B-H loop tracer at 60 Hz. Wear resistance measurement was carried out with a VTR deck, on which head chip shaped samples were mounted, and a metal tape was run therethrough at room temperature for 100 hours, the respective amounts of partial abrasion of the films 1 and 2 relative to the surface of the substrate being measured by a Taly step.

<Embodiment 2>

6.5 wt % Si-Fe alloy films 1 and $Fe_{85}Si_{9.6}Al_{5.4}$ (wt %) alloy films 2 were alternately laminated on a substrate having a thermal expansion coefficient $\alpha$ of $1.3 \times 10^{-5}/°C$. by sputtering and the properties were examined in a similar manner described in Embodiment 1. The results are shown in Table 2.

TABLE 2

| Sample No. | FS1010 | FS69 | FS55 | FS53 | FS33 | FS11 |
|---|---|---|---|---|---|---|
| $t_1$ (Å) | 1000 | 600 | 500 | 500 | 300 | 100 |
| $t_2$ (Å) | 1000 | 900 | 500 | 300 | 300 | 100 |
| n (number of layers) | 30 | 40 | 60 | 75 | 1000 | 300 |
| $4\pi M_s$ (Gauss) | 14000 | 13200 | 14000 | 14800 | 13500 | 13000 |
| $H_c$ (Oe) | 5 | 2.5 | 2 | 4 | 3 | 4 |
| Partial abrasion (Å) $\Delta l_1$ | 500 | 150 | 150 | 150 | 100 | 50 |
| $\Delta l_2$ | 100 | 50 | 70 | 100 | 50 | 50 |

<Embodiment 3>

Samples FP were prepared by laminating 6.5 wt % Si-Fe films (film 1) and $Ni_{80}$-$Fe_{20}$ (wt %) films (film 1'), the samples FI were prepared by laminating 6.5 wt % Si-Fe films (film 1) and $SiO_2$ films (film 3), and the samples FAI were prepared by laminating 6.5 wt % Si-Fe films, $Co_{87}Nb_9Zr_4$ amorphous alloy films (film 2), and $SiO_2$ films, in a similar manner to Embodiment 1 by means of a sputtering method, the properties of these samples were examined in a similar manner described in Embodiment 1. The results are shown in Table 3 for comparison.

TABLE 3

| | Conventional examples | | | | This invention | |
|---|---|---|---|---|---|---|
| Sample | FP51 | FP33 | FI51 | FI33 | FA33 | FAI |
| Thickness of each layer (Å) $t_1$ | 500 | 300 | 500 | 300 | 300 | 250 |
| $t_1'$ | 100 | 300 | | | | |
| $t_2$ | | | | | 300 | 250 |
| $t_3$ | | | 100 | 300 | | 100 |
| $4\pi M_s$ (Gauss) | 16300 | 13000 | 15000 | 9000 | 13800 | 11000 |
| $H_c$ (Oe) | 2 | 10 | 2 | 12 | 1 | 1 |
| Partial abrasion (Å) $\Delta l_1$ | 500 | 500 | 300 | 200 | 100 | 70 |
| $\Delta l_1$ | 500 | 500 | | | | |
| $\Delta l_2$ | | | | | 50 | 0 |
| $\Delta l_3$ | | | ·0 | 0 | | 0 |

Figure 6:
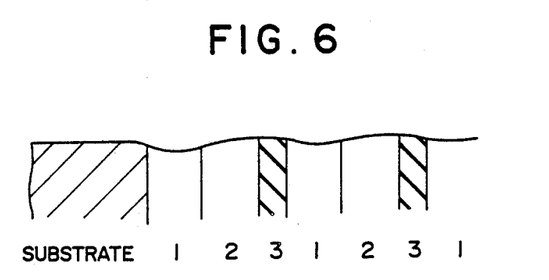

The typical abrasion characteristics of the samples FI51, FP51 and FAI are illustrated in FIGS. 4a, 4b, and 6.

It was found that the present invention provides laminated magnetic materials which have soft magnetic property, high saturation magnetization, and superior abrasion and wear resistance.

<Embodiment 4>

6.5 wt % Si-Fe films 1 and $Co_{87}Nb_9Zr_4$ amorphous alloy films 2 were laminated by sputtering and Ag films having a thickness of 12 Å were interposed therebetween, the resulting multi-layer film being subjected to heat treatment in a rotating magnetic field at 400° C. for 30 minutes. The results are shown in Table 4.

TABLE 4

| Sample | FA33 | FA11 | FA55 | FAG33 | FAG11 | FAG55 |
|---|---|---|---|---|---|---|
| Thickness of each film (Å) $t_1$ | 300 | 100 | 50 | 300 | 100 | 50 |
| $t_2$ | 300 | 100 | 50 | 300 | 100 | 50 |
| $t_{Ag}$ | 0 | 0 | 0 | 12 | 12 | 12 |
| $H_c$ (Oe) As prepared | 1 | 1 | 1 | 1 | 0.8 | 0.7 |
| $H_c$ (Oe) after heat treatment in magnetic field | 0.5 | 1 | 3 | 0.5 | 0.4 | 0.4 |

As for the layered films without Ag films, the soft magnetic property can be improved by annealing when $t_1$ and $T_2$ are 300 Å or more. However, when $t_1$ and $t_2$ are about 50 Å, interdiffusion probably occurs between the films 1 and 2, resulting in a deterioration of the soft magnetic property. On the other hand, as for the layered film with the Ag film interposed between the films 1 and 2, the soft magnetic property was found to be improved by annealing, because the Ag film neither form a solid solution regarding film 1 nor film 2 and can be a barrier against the interdiffusion. It was also found from experiments that Cu and Mg produce a similar effect to that of Ag.

However, this interposition complicates the process of forming a multilayered film and decreases the saturation magnetization of the whole multilayered film.

With respect to the laminated alloy film composed of a Fe-Si alloy and a Fe-Si-Al alloy, an epitaxial growth is possible along the (110) direction. It was found that the above-described interlayer diffusion does not easily occur in this epitaxial film.

The Fe-Si alloy and the Fe-Si-Al alloy have body-centered cubic structures, lattice constants being close to each other, and (110) oriented films of these alloys are relatively easily obtained. Taking these facts into consideration, Fe-Si/Fe-Si-Al super lattice films epitaxially grown along the (110) direction are prepared, where interdiffusion between the layers is found to hardly occur. In general, Fe-Si and Fe-Si-Al films prepared by sputtering have no orientation and, when these films are laminated and annealed at a high temperature, the interlayer diffusion is apt to occur. However, it was found that the interlayer diffusion hardly occurs in the epitaxially grown Fe-Si/Fe-Si-Al super lattice films even when the films are annealed at relatively high temperature. These epitaxially grown film can be obtained as follows. Regarding such epitaxial growth, when a first layer having a relatively large thickness is grown on a heated substrate so as to form that (110) plane, the following layers are epitaxially grown and oriented in the direction of the (110) plane even if they are thin.

In a case where a good epitaxial growth along the (110) direction can not be obtained unless the first layer is made to have a relatively large thickness, a GaAs substrate on which a (110) oriented film is easily grown may be used or a V (vanadium) non-magnetic film etc. which is easily oriented in the direction of the (110) plane may be formed in a suitable thickness on a substrate, and the above-described film essentially composed of Fe-Si and Fe-Si-Al are then epitaxially grown on this (110) plane. Consequently, a super lattice magnetic substance epitaxially grown in the direction of the (110) plane can be obtained even if the thickness of one film is 500 Å or less. The obtained super lattice magnetic substance was found to have high saturation magnetization, soft magnetism, a superior wear resistance which is required for a magnetic head core material, and sufficient thermal stability for high temperature annealing.

The effect of the present invention will now be explained in detail with reference to the following embodiments.

<Embodiment 5>

A V (vanadium) film having a thickness of 500 Å was formed on a glass substrate with $\alpha = 1.3 \times 10^{-5}/°C$. heated at 350° C. by using an r.f. diode sputtering apparatus having three targets, and then a multi-layer film was formed thereon by alternately laminating 40 layers of $Fe_{83.5}Si_{6.5}$ films and $Fe_{85}Si_{9.6}Al_{5.4}$ films with 500 Å thickness. Subsequently, a multi-layer film was formed in the same manner so that the thickness $t_F$ of each of the Fe-Si films and the thickness $t_S$ of each of the Fe-Si-Al films was respectively 1000 Å and 250 Å. For comparison, a multi-layer film was formed by alternately laminating a total of 80 layers of the Fe-Si films and the Fe-Si-Al films, in each of which $t_F = t_S = 250$ Å, directly on a glass substrate cooled with water. With respect to each of various films formed in such manners, their crystal structures were examined by X-ray diffraction, their magnetization were measured with VSM, their coercive force $H_c$ was measured at 60 Hz by a B-H tracer, and their magnetic permeabilities were measured by a vector impedance meter. The results thereof are shown in Table 5.

TABLE 5

| Sample name | VFS100 | VFS50 | VFS25 | FS'25 |
|---|---|---|---|---|
| Under Layer | Vanadium | Vanadium | Vanadium | No Under Layer |
| $t_F = t_S$ (Å) | 1000 | 500 | 250 | 250 |
| Number of Layers (n) | 20 | 40 | 80 | 80 |
| Crystal structure | Complete (110) orientation | Complete (110) orientation | Complete (110) orientation | Not-oriented |
| $4\pi M_s$ (Gauss) | 14000 | 14000 | 14000 | 14000 |
| $H_c$ (Oe) | | | | |
| As prepared | 12 | 6 | 4 | 4 |
| After annealing at 400° C. | 5 | 2 | 1.5 | 2.5 |
| After annealing at 500° C. | 3 | 1.5 | 1.0 | 6 |
| $\mu$ (5 MHz) (after annealing at 500° C.) | 800 | 1500 | 2500 | 300 |

As is clear from the above-described embodiment, the sample VFS which was epitaxially grown in the (110) direction exhibited better thermal stability at 400° C. in comparison with the sample FS' which was not expitaxially grown.

Figure 7:
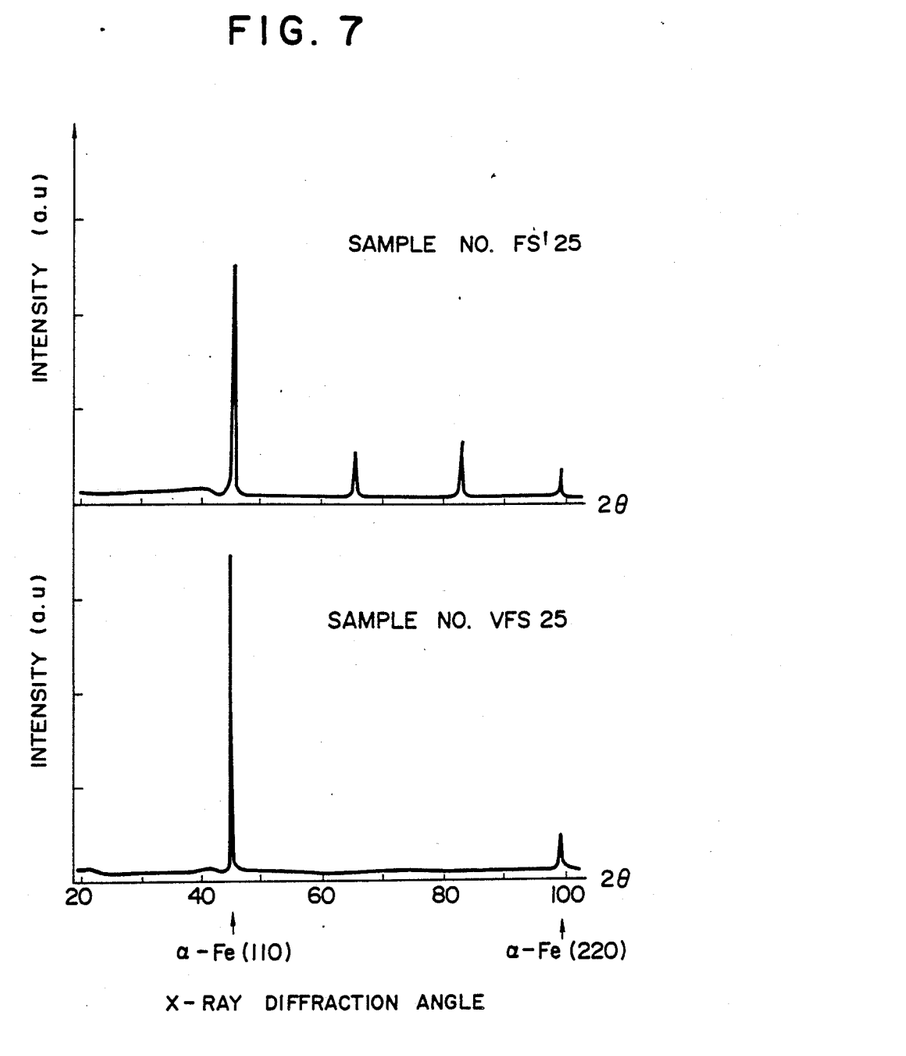
FIG. 7 shows graphs of X-ray diffraction patterns of Fe-Si/Fe-Si-Al super lattice magnetic substance and the Fe-Si/Fe-Si-Al multi-layer film of the embodiment of the present invention.

In addition, it was found that the film V is effective for the epitaxial growth and that, with respect to the magnetic characteristics, the smaller the thickness t of each film, the better the soft magnetism is, and that the thickness t be preferably not more than 500 Å. FIG. 7 shows the X-ray (CuKα) diffraction patterns of the sample VFS25 and FS'25.

<Embodiment 6>

Multi-layer films were formed by alternately laminating Fe-Si and Fe-Si-Al films on a (110) GaAs substrate heated at 350° C., by using the same apparatus as in Embodiment 5. Another film was formed on a glass substrate heated at 350° C. in the same manner. The comparison of the crystal structures and the magnetic characteristics are shown in Table 6.

TABLE 6

| Sample name | GFS50 | GFS5025 | GFS25 | FS25 |
|---|---|---|---|---|
| Substrate | (110) GaAs | (110) GaAs | (110) GaAs | Glass |
| $t_F$ (Å) | 500 | 500 | 250 | 250 |
| $t_S$ (Å) | 500 | 250 | 250 | 250 |
| Number of Layers (n) | 20 | 30 | 40 | 40 |
| Crystal structure | Complete (110) orientation | Complete (110) orientation | Complete (110) orientation | Slight (110) orientation |
| $4\pi M_s$ (Gauss) | ~14000 | ~15300 | ~14000 | ~14000 |
| $H_c$ (Oe) | | | | |
| As prepared | 6 | 6 | 4 | 6 |
| After annealing at 400° C. | 3 | 3 | 1.5 | 6 |
| After annealing | 2 | 2 | 1.0 | 8 |

TABLE 6-continued

| Sample name | GFS50 | GFS5025 | GFS25 | FS25 |
|---|---|---|---|---|
| at 500° C. | | | | |

Figure 8:
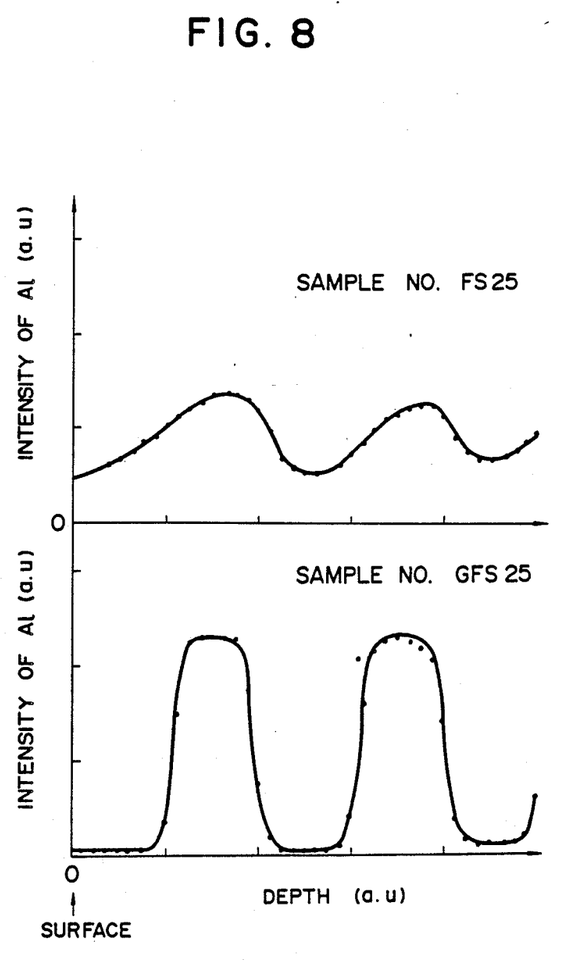
FIG. 8 depicts graphs showing the composition distribution of Al in the depth direction of the embodiment of FIG. 7 which graphs were obtained by means of SIMS.

The sample FS25 formed on the heated glass substrate seemingly shows an improved (110)-plane orientation in the X-ray diffraction pattern in comparison with the sample FS'25 which was formed on the substrate cooled with water and which is shown in Embodiment 5. However, it is thought that the epitaxial growth is not complete and the Fe-Si films and the Fe-Si-Al films are partially alloyed by the interdiffusion occurring therebetween during the deposition process on the heated substrate, whereby the orientation in the (110)-plane direction is seemingly improved as a whole. The soft magnetism is actually not improved by the annealing and its characteristics are inferior to the sample FS'25. It was found that the samples formed on the GaAs (110) plane were epitaxially grown, thermally stable, and were improved in their characteristics as a result of the annealing. FIG. 8 shows the depth profile of the Al composition measured by SIMS, of the samples FS25 and GFS25 in the direction of the thickness. It was found that FS25 shows in interlayer diffusion of Si, while GFS25 shows a profile reflecting a super lattice structure.

As described above, it was found that soft magnetic alloy films having excellent abrasion resistance and high saturation magnetization can be obtained by laminating an Fe-Si alloy and an amorphous alloy or Fe-Si-Al alloy films which have a small magnetostriction and which are extremely thin. However, there were disadvantages in that the Fe-Si alloy was insufficient in corrosion resistance and the average magnetostriction of the films showed different tendencies, depending upon the production methods employed. In the above-described embodiments, the deterioration of the magnetic characteristics due to magnetostriction may be prevented by employing as substrates materials with thermal expansion coefficient $\alpha$, value of which is close to that of alloy films. It is preferable that the magnetostriction $\lambda$ is zero so that magnetic property is not easily deteriorated even if the alloy films are formed on a substrate with different value of thermal expansion coefficient. In order to solve these problems, the zero magnetostrictive composition of the (110) oriented Fe-Si films prepared by sputtering was studied. The corrosion resistance was improved by adding Cr. As a result, it was found that films in which $\lambda$ is desirably small and in which the corrosion resistance was improved can be obtained in two ranges, as described below.

The $Fe_xSi_yCr_z$ alloy film is oriented so that the direction of the film plane becomes (110) in a proportion of 80% or more, and it is preferable that its composition is within the following ranges in terms of weight %:

$$0.5 \leq y \leq 4 \quad \text{(I)}$$
$$1 \leq z \leq 10$$
$$x + y + z = 100$$

$$8 \leq y \leq 13 \quad \text{(II)}$$
$$0.1 \leq z \leq 5$$
$$x + y + z = 100$$

It was found that a material obtained by laminating this alloy film and a film of amorphous alloy or the Fe-Si-Al alloy exhibited excellent soft magnetic characteristics and considerably good corrosion resistance. The degree of orientation was defined by the ratio of the diffraction intensity on the (110) plane to the total diffraction intensity in the X-ray diffraction.

<Embodiment 7>

Figure 9A:
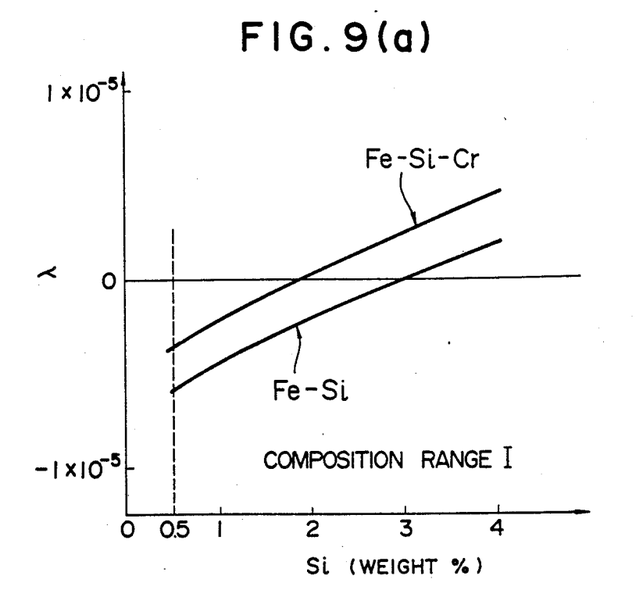
FIGS. 9a and 9b are graphs showing the dependence of the saturation magnetostriction $\lambda$ of a Fe-Si alloy film and a Fe-Si-Cr alloy film upon the Si concentration.

A film was formed on a substrate with $\alpha = 1.0 \times 10^{-5}/°C$. using a composite target which was composed of $Fe_xSi_y$ (x+y=100, 0<y<14 wt %) and a small piece of Cr mounted thereon by r.f. suputtering at an Ar gas pressure of $1.2 \times 10^{-2}$ Torr and with electric power supplied at 350 W. The magnetostriction was measured from the change of the B-H curves occurring under tensile stress or compressive stress applied to the film. As shown in FIG. 9a, although the magnetostriction of the oriented Fe-Si film becomes small at approaching 2 to 4 wt % of Si, when Cr is added thereto, the composition at $\lambda = 0$ shifts to the direction in which the Si content is small, so that the absolute value $|\lambda|$ of magnetostriction can be reduced by decreasing the Si amount. In this case, the range in which the $\lambda$ value is small and a relatively soft magnetism is obtained is 0.5 to 4 wt % of the Si content, which is indicated by the composition range (I).

Figure 9B:
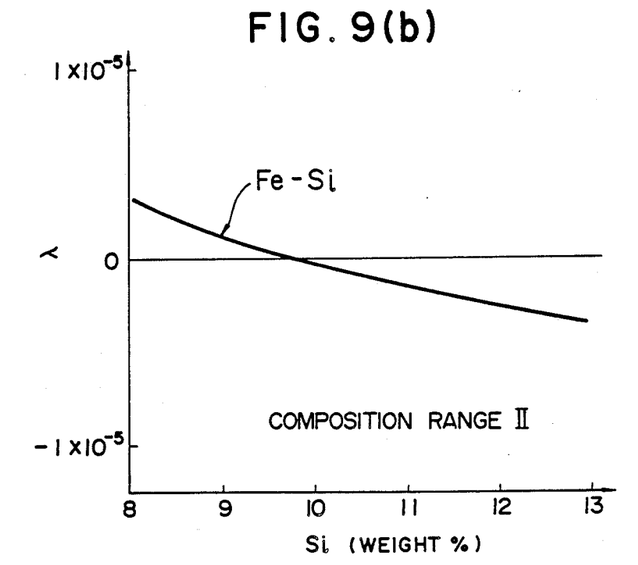

As shown in FIG. 9b, $\lambda$ again becomes zero when Si content is around 10 wt %. If Cr is added thereto, the composition of bringing about $\lambda = 0$ shifts to some extent but the amount of the shift of Si content is less than 1 wt %. In this case, the range in which the absolute value $\lambda$ is small and soft magnetism is exhibited is 8 to 13 wt % of the Si content which is indicated by the composition range (II).

Figure 10:
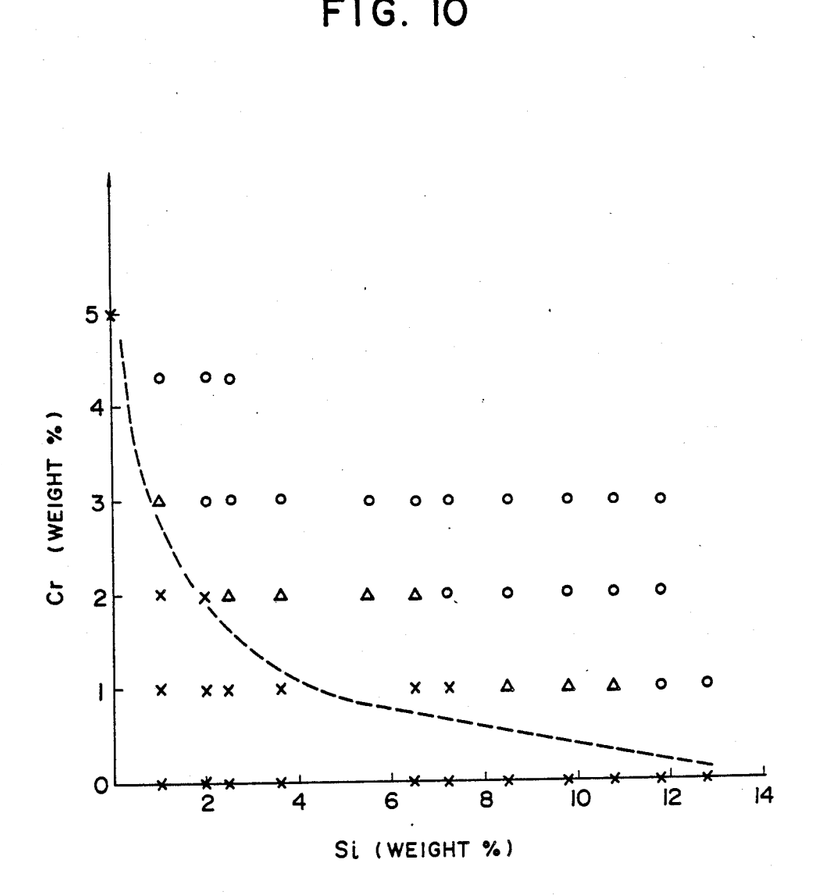
FIG. 10 is a graph showing the dependence of the corrosion resistance of the Fe-Si-Cr alloy film upon the Si and Cr concentrations.

The corrosion resistance was determined by observing the state of rust occurred after the film was soaked in pure water for 24 hours at room temperature. The results of the corrosion resistance are shown in FIG. 10, with the marks O (excellent), Δ (good) and x (poor). It is necessary, if sufficient corrosion resistance is required, to make the content of Cr in the film not less than 1 wt % in the range (I) or not less than 0.1 wt % in the range (II). The required amount of Cr is generally decreased as the Si amount is increased. It was found that addition of Cr can prevent the occurrence of rust and greatly improve the corrosion resistance.

Figure 11A:
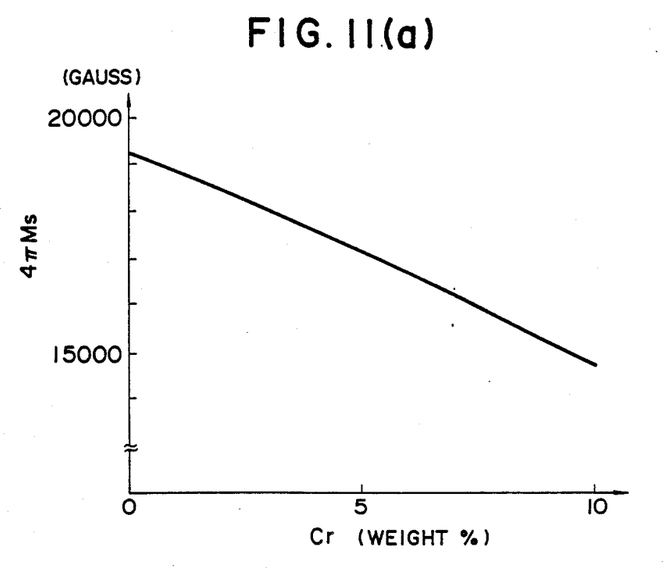
FIGS. 11a and 11b are graphs showing the dependence of the saturation magnetization $4\pi M_s$ of the Fe-Si-Cr alloy film upon Cr concentration.
Figure 11B:
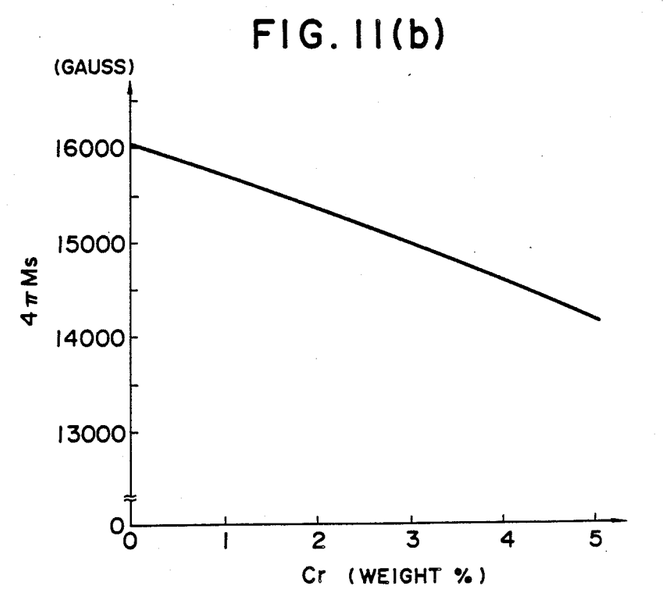

The saturation magnetization $4\pi M_s$ was measured with VSM. FIG. 11a shows the dependence upon the Cr concentration with respect to $4\pi M_s$ for a film obtained by sputtering-process and having a composition of $(Fe_{0.975}Si_{0.025})_{100-x}Cr_x$ (wt %) When Cr is added to the Fe-Si alloy, $4\pi M_s$ generally decreases as the Cr concentration increases. However, it was found that since $4\pi M_s$ of the Fe-Si alloy containing 10 wt % or less of Si is originally high (about 16000 to 21000 Gauss), magnetic materials having a high saturation magnetization, compared with conventional magnetic materials used for magnetic heads, can be obtained even if Cr is contained in an amount sufficient to obtain adequate corrosion resistance. However, since the addition of Cr in an amount which is more than what is required to improve the corrosion resistance decreases the saturation magnetization, the amount of Cr is preferably 10 % or less in the range (I). FIG. 11b shows the dependence of $4\pi M_s$ upon the Cr concentration regarding a sputtered film having a composition of $(Fe_{0.9}Si_{0.1})_{100-x}Cr_x$ (wt %). It was found that, in the range (II), even if Cr is added in order to obtain sufficient corrosion resistance, a material having high saturation magnetization, compared with conventional magnetic materials used for magnetic heads, can be obtained when the amount of Cr added is 5 wt % or less.

The coercive force at 60 Hz for various Fe-Si and Fe-Si-Cr films formed by the sputtering method was measured by an a.c. B-H tracer after they were annealed in a rotating magnetic field at 500° C. for 30 minutes. The results of these measurements and of corrosion resistance tests are shown by such marks as O (excellent), Δ (good), and x (poor) in Table 7. In this embodiment, materials with a much smaller value of α than that of the films were used as substrates so that the dependence of the magnetic property upon the magnetostriction clearly appeared.

TABLE 7-1

| Alloy film (wt %) | Corrosion resistance | $H_c$(Oe) |
|---|---|---|
| Range (I) compositions | | |
| $Fe_{96}Si_1Cr_3$ | Δ | 5 |
| $Fe_{95}Si_2Cr_3$ | O | 5 |
| $Fe_{94.5}Si_{2.5}Cr_3$ | O | 4 |
| $Fe_{93.5}Si_{3.5}Cr_3$ | O | 6 |
| Comparative examples | | |
| $Fe_{93.5}Si_{6.5}$ | x | 5 |
| $Fe_{90.5}Si_{6.5}Cr_3$ | O | 17 |

TABLE 7-2

| Alloy film (wt %) | Corrosion resistance | $H_c$(Oe) |
|---|---|---|
| Range (II) compositions | | |
| $Fe_{89}Si_9Cr_2$ | O | 6 |
| $Fe_{88}Si_{10}Cr_2$ | O | 5 |
| $Fe_{87}Si_{11}Cr_2$ | O | 3 |
| $Fe_{86}Si_{12}Cr_2$ | O | 7 |
| Comparative examples | | |
| $Fe_{93.5}Si_{6.5}$ | x | 5 |
| $Fe_{91.5}Si_{6.5}Cr_2$ | Δ | 15 |

It was found that magnetic materials exhibiting both magnetic characteristics suitable for magnetic heads and higher saturation magnetization than that of a conventional magnetic material can be obtained by forming a laminated structure composed of these Fe-Si-Cr alloy films and amorphous alloy films such as Co-Nb based films, which show small values of λ and $H_c$, or Sendust films essentially composed of Fe-Si-Al. Generally, the value of the saturation magnetization of laminated films becomes substantially the average of those of the films. FIG. 12-1 shows the layer thickness dependence of the coercive force of a multi-layer film obtained by laminating $Fe_{94.5}Si_{2.5}Cr_3$ (wt %) alloy layers, $Fe_{84}Si_{10}Al_6$ (wt %) layers, and $Co_{85}Nb_{10}Ta_2Zr_3$ (at%) layers using a sputtering apparatus equipped with two targets.

FIG. 12-2 shows the layer thickness dependence of the coercive force Hc of a multi-layer film obtained by laminating $Fe_{88}Si_{10}Cr_2$ (wt %) alloy layers, $Fe_{84}Si_{10}Al_6$ (wt %) layers, and $CO_{85}Nb_{10}Ta_2Zr_3$ (at%) layers using the same sputtering apparatus. These multilayer films were prepared so that the layer thicknesses of the Fe-Si-Cr, Fe-Si-Al, and Co-Nb-Ta-Zr layers are equal to each other. It was found from the results shown in FIG. 12-2 that $H_c$ depends upon the thickness and that the thickness of each film be 1000 Å or less in order to obtain soft magnetic property and preferably 500 Å or less in order to obtain better characteristics.

We claim:

1. Laminated magnetic materials comprising first thin films having a magnetostrictive constant λ less than $1 \times 10^{-5}$ consisting essentially of Fe and Si, and second thin films different from said first thin films, said second thin films being composed of an amorphous alloy or Fe-Si-Al alloy each of which alloys has a magnetostrictive constant λ less than $1 \times 10^{-5}$ and excellent wear resistance, said first and second thin films being alternately laminated, the thickness ($t_1$) of said first films and the thickness ($t_2$) of said second films meeting the following conditions: both $t_1$ and $t_2 < 300$ Å; and $t_1 < 2t_2$ to simultaneously provide superior wear resistance and superior magnetic characteristics, both of which are necessary to produce a magnetic head of improved quality.

2. Laminated magnetic materials according to claim 1, wherein an amorphous alloy film mainly composed of Co-Nb is used as said second films.

3. Laminated magnetic materials according claim 1, wherein a film of one kind selected from the group consisting of Ag, Cu and Mg which do not easily a solid solution with each of said Fe-Si, Fe-Si-Al and said amorphous alloy films is interposed between said first and said second films.

4. Laminated magnetic materials according to claim 1, wherein insulator films are interposed between said first and said second films.

5. Laminated magnetic materials according to wherein said laminated alloy films formed by alternately laminating said first thin films essentially composed of Fe-Si and said second thin films of an Fe-Si-Al alloy has a structure formed by an epitaxial growth so that the plane of the film becomes (110) in orientation.

6. Laminated magnetic materials according to claim 5, wherein a non-magnetic film able to promote the (110) orientation is formed on a substrate, said magnetic alloy films being epitaxially grown thereon.

7. Laminated magentic materials comprising first thin films having a magnetostrictive constant λ less than $1 \times 10^{-5}$ which are magnetic alloy films defined by $Fe_xSi_yCr_z$ and having a degree of orientation of not less than 80% in the direction of the (110)-plane, said x, y, and z being made to meet the following conditions in terms of weight %:

$$0.5 < y \leq 4;$$

$$1 \leq z \leq 10; \text{ and}$$

$$x + y + z = 100$$

and second thin films different from said first thin films, said second thin films being composed of an amorphous alloy or Fe-Si-Al alloy each of which alloys has a magnetostrictive constant λ less than $1 \times 10^{-5}$ and excellent wear resistance, said first and second thin films being alternately laminated, the thickness ($t_1$) of said first films and the thickness ($t_2$) of said second films meeting the following conditions: both $t_1$ and $t_2 < 500$ Å; and $t_1 < 2t_2$ to simultaneously provide superior wear resistance and superior magnetic characteristics, both of which are necessary to produce a magnetic head of improved quality.

8. Laminated magnetic materials according to claim 7, wherein said amorphous alloy comprises a Co-based alloy.

9. Laminated magnetic materials according to claim 8, wherein said Co-based alloy comprises a Co-Nb alloy.

10. Laminated magnetic materials according to claim 8, wherein said Co-based alloy comprises a Co-Nb-Zr alloy.

11. Laminated magnetic materials according to claim 8, wherein said Co-based alloy comprises $Co_{87}Nb_9Zr_4$.

12. Laminated magnetic materials according to claim 8, wherein said Co-based alloy comprises $Co_{85}Nb_{10}Ta_2Zr_3$.

13. Laminated magnetic materials comprising first thin films having a magnetostrictive constant $\lambda$ less than $1 \times 10^{-5}$, which are magnetic alloy films defined by $Fe_{x'}Si_{y'}Cr_{z'}$ and having a degree of orientation of not less than 80% in the direction of the (110)-plane, said $x'$, $y'$, and $z'$ being made to meet the following conditions in terms of weight %:

$$8 < y' < 13;$$
$$0.1 < z' < 5; \text{ and}$$
$$x' + y' + z' = 100$$

and second thin films different from said first thin films, said second thin films being composed of an amorphous alloy or Fe-Si-Al alloy each of which alloys has a magnetostrictive constant $\lambda$ less than $1 \times 10^{-5}$ and excellent wear resistance, said first and second thin films being alternately laminated, the thickness ($t_1$) of said first films and the thickness ($t_2$) of said second films meeting the following conditions: both $t_1$ and $t_2 < 500$ Å; and $t_1 < 2t_2$ to simultaneously provide superior wear resistance and superior magnetic characteristics, both of which are necessary to produce a magnetic head of improved quality.

14. Laminated magnetic materials according to claim 13, wherein said amorphous alloy comprises a Co-based alloy.

15. Laminated magnetic materials according to claim 14, wherein said Co-based alloy comprises a Co-Nb alloy.

16. Laminated magnetic materials according to claim 14, wherein said Co-based alloy comprises a Co-Nb-Zr alloy.

17. Laminated magnetic materials according to claim 14, wherein said Co-based alloy comprises $Co_{87}Nb_9Zr_4$.

18. Laminated magnetic materials according to claim 14, wherein said Co-based alloy comprises $Co_{85}Nb_{10}Ta_2Zr_3$.

* * * * *